UNITED STATES PATENT OFFICE.

PHILIPP EYER, OF HALBERSTADT, GERMANY, ASSIGNOR TO THE FIRM OF RUDOLPH KOEPP & CO., OF OESTRICH-ON-THE-RHINE, GERMANY, A SOCIETY OF GERMANY.

COMPOSITION AND PROCESS FOR MAKING ENAMEL.

1,256,455.  Specification of Letters Patent.  Patented Feb. 12, 1918.

No Drawing.  Application filed July 21, 1915. Serial No. 41,197.

*To all whom it may concern:*

Be it known that I, PHILIPP EYER, a subject of the German Emperor, and resident of Halberstadt, Germany, have invented certain new and useful Improvements in Compositions and Processes for Making Enamel, of which the following is a specification.

My invention relates to the enameling of iron and more especially to the preparation of the enamel itself. In preparing such enamels for coating iron and iron goods the masses usually contain great quantities of fluxes such as boric acid, borax or compounds of lead. Non-poisonous enamel as used for cooking vessels and the like is prepared almost exclusively by aid of the costly compounds of boron. In some prescriptions the costs of the borax employed in the composition exceed those of all the other ingredients.

I have now ascertained that it is possible to dispense with part or even the whole of the borax hitherto used, if instead of borax or other fluxes comparatively great quantities of glass, and more especially of glass having a low melting temperature, are employed. I have further ascertained that even such glasses as are practically free from borax, such as for instance the so-called Thuringian tube-glass or the ordinary glass used in glass presses, may be employed to replace considerable quantities of borax without imparing the quality of the enamel obtained.

It will be appreciated that such glasses will be most readily adapted to the preparation of enamels which contain some fluxes such as borax, lead or both of them. If such glasses are added, the usual addition of borax may be greatly diminished and may in some cases even be dispensed with altogether.

A non-poisonous enamel is prepared for instance by mixing 3 parts of quartz, 3 parts of feldspar, 15 parts of optical glass containing 10 per cent. boric acid, 0.5 parts of saltpeter, 3 parts of cryolite and 2.5 parts of sodium carbonate, melting the mixture and treating it in the grinding mill in the usual manner, quartz and clay being added according to the requirements of each case. An enamel containing lead is obtained by mixing 15 parts of quartz, 15 parts of feldspar, 30 parts of lead-glass, 10 parts of sodium carbonate, 6 parts of sodium silicofluorid and 1 part of saltpeter, melting the mixture and adding to the ground mixture suitable coloring matter, such as metal oxids. In replacing borax or boric acid by glass, it has proved advantageous to provide for the presence of fluorin compounds, as will be noted from the above. Of such compounds the alkali metal compounds of fluorin such as alkali metal silicofluorids and cryolite are especially suitable.

By the addition of glass practised in this manner another advantage is obtained. It is very desirable to have sodium carbonate in the mixture for the reason that a content of sodium will produce a high luster. However it is not possible to add more than small quantities of soda owing to the production of blisters caused by the addition of greater quantities. I have ascertained that the alkali contained in glass does not produce such blisters and it is therefore possible by adding glass to obtain enamels containing far greater quantities of alkali (sodium) and presenting a very high brilliancy without any blisters being formed.

Enamels showing a very high power of resistance are obtained by replacing all or almost all of the quartz by glass. In the case of mixtures containing feldspar it is preferable to replace this constituent by glass also, care being taken to add a quantity of clay corresponding to the alumina contained in the feldspar. In some cases it has proved useful to add still larger quantities of clay. The quartz may be replaced by glass in all enamels containing quartz either alone or together with feldspar, the effect obtained in the latter case being especially favorable. It has been proved exceedingly important to add clay to the mixture for the reason, that such clay is found to counteract the inferior capacity for spreading caused by a too high content of glass. The addition of clay therefore renders it possible to add larger quantities of glass.

Thus an ordinary mixture for a white enamel containing 19 parts of borax, 30 parts of feldspar, 28 parts of quartz, 12 parts of cryolite, 1 part of saltpeter and 4 parts of sodium carbonate can be replaced, according to the present invention, by a mixture of 60 parts of artificial ruby (ruby glass) containing 10 to 12 per cent. boric acid, 16 parts of clay, 12 parts of cryolite and 7 parts of sodium carbonate. This mixture is superior to the one mentioned in the first place in fluidity, spreading capacity, resistance, especially against the action of acids, and luster.

Enamels have been prepared heretofore with an addition of glass, but in all such cases the glass was a mere addition, all the other constituents being used as well. It has not heretofore been known that by adding great quantities of glass the costly borax could be dispensed with, the qualities of the enamel, especially with regard to resistance against acids, being materially improved.

In some cases it has proved useful to first melt the glass with a number of other substances, such as alkali compounds or fluxing materials, and to introduce the molten product, which forms a borax substitute, into the enamel mixture.

Thus 80 parts of glass can be melted down with 40 parts of sodium carbonate. If in some prescription for making enamel the borax shall be replaced by this molten product, 1 part of borax and 1 part of quartz may be replaced by 1½ parts of the molten product. In the production of this latter product the favorable effect of an addition of clay may be turned to account, and a certain percentage of borax will prove useful also. Thus for instance 80 parts of glass, 40 parts of sodium carbonate, 30 parts of borax and 40 parts of clay are mixed and melted down. Of the substitute thus obtained 2 parts are used to replace 1 part of borax, 1 part of quartz and ½ part of feldspar.

In the following claims the expression "enamel constituents" includes enamel constituents other than purely fluxing materials.

I claim:—

1. A composition for producing enamels for iron goods comprising glass, enamel constituents, and fluxing material in quantity insufficient to properly flux the enamel, said glass replacing fluxing material.

2. A composition for producing enamels for iron goods comprising glass, enamel constituents, and boron containing fluxing material in quantity insufficient to properly flux the enamel, said glass replacing fluxing material.

3. A composition for producing enamels for iron goods comprising glass containing fluxing materials, enamel constituents and fluxing material in quantity insufficient to properly flux the enamel, said glass replacing fluxing material.

4. A composition for producing enamels for iron goods comprising glass containing boron compounds, enamel constituents and fluxing material in quantity insufficient to properly flux the enamel, said glass replacing fluxing material.

5. A composition for producing enamels for iron goods comprising glass rich in alkali, enamel constituents and fluxing material in quantity insufficient to properly flux the enamel, said glass replacing fluxing material.

6. A composition for producing enamels for iron goods comprising glass rich in alkali and containing other fluxing materials, enamel constituents and fluxing material in quantity insufficient to properly flux the enamel, said glass replacing fluxing material.

7. A composition for producing enamels for iron goods comprising glass rich in alkali and containing boron compounds, enamel constituents and fluxing material in quantity insufficient to properly flux the enamel, said glass replacing fluxing material.

8. A composition for producing enamels for iron goods comprising glass rich in alkali and containing lead compounds, enamel constituents and fluxing material in quantity insufficient to properly flux the enamel, said glass replacing fluxing material.

9. A composition for producing enamels for iron goods comprising glass, fluorin compounds, and other enamel constituents and fluxing material in quantity insufficient to properly flux the enamel, said glass replacing fluxing material.

10. A composition for producing enamels for iron goods consisting of glass, clay, cryolite and sodium carbonate.

11. A composition for producing enamels for iron goods consisting of boron containing glass, clay, cryolite and sodium carbonate.

12. A composition for producing enamels for iron goods comprising glass, clay, and other enamel constituents and fluxing materials in quantity insufficient to properly flux the enamel, said glass replacing fluxing material.

13. An enamel composition consisting of 60 parts of boron containing glass, 16 parts clay, 12 parts cryolite and 7 parts sodium carbonate.

14. A composition for producing enamel for iron goods comprising boron containing glass fluorin compounds, and other enamel constituents other than flux, and fluxing material in quantity insufficient to flux the enamel, said glass replacing fluxing material.

15. A new process for the production of enamels for iron goods, consisting in mixing glass, clay, enamel constituents other than fluxing materials and fluxing material in quantity insufficient to flux the enamel, said glass replacing said fluxing materials, and fusing said mixture.

In testimony whereof I have signed my name to this specification in the presence of two subscribing witnesses.

PHILIPP EYER.

Witnesses:
JEAN GRUND,
CARL GRUND.